（12） United States Patent
Leung et al.

(10) Patent No.: US 7,280,695 B2
(45) Date of Patent: Oct. 9, 2007

(54) SYSTEM AND METHOD OF PEN-BASED DATA INPUT INTO A COMPUTING DEVICE

(75) Inventors: Paul Chung Po Leung, Vancouver (CA); Kenneth Kee Ho, Coquitlam (CA); Kiffin Kin Fong Tam, Richmond (CA); Michael Chang, Delta (CA)

(73) Assignee: Empower Technologies, Inc., Redmond, WA (US)

( * ) Notice: Subject to any disclaimer, the term of this patent is extended or adjusted under 35 U.S.C. 154(b) by 636 days.

(21) Appl. No.: 10/160,434

(22) Filed: May 31, 2002

(65) Prior Publication Data

US 2003/0028851 A1    Feb. 6, 2003

Related U.S. Application Data

(60) Provisional application No. 60/305,385, filed on Jul. 13, 2001, provisional application No. 60/295,067, filed on May 31, 2001.

(51) Int. Cl.
G06K 9/00    (2006.01)
(52) U.S. Cl. ..................................... 382/187
(58) Field of Classification Search ................. 345/168
See application file for complete search history.

(56) References Cited

U.S. PATENT DOCUMENTS

| 4,180,337 | A |   | 12/1979 | Otey, III et al. |
| 4,918,740 | A | * | 4/1990 | Ross ........................... 382/177 |
| 4,963,044 | A |   | 10/1990 | Warner |
| 5,361,310 | A | * | 11/1994 | Ishigaki ...................... 382/187 |
| 5,487,616 | A |   | 1/1996 | Ichbiah |
| 5,513,278 | A | * | 4/1996 | Hashizume et al. ........ 382/187 |
| 5,548,705 | A |   | 8/1996 | Moran et al. |
| 5,555,363 | A |   | 9/1996 | Tou et al. |
| 5,889,888 | A |   | 3/1999 | Marianetti, II et al. |
| 6,054,990 | A |   | 4/2000 | Tran |
| 6,094,197 | A |   | 7/2000 | Buxton et al. |
| 6,188,789 | B1 | * | 2/2001 | Marianetti et al. .......... 382/189 |
| 6,292,857 | B1 | * | 9/2001 | Sidoroff et al. ............... 710/54 |
| 6,417,874 | B2 |   | 7/2002 | Bodnar |

FOREIGN PATENT DOCUMENTS

| DE | 2517555 | 11/1976 |
| EP | 0511658 A2 | 11/1992 |
| EP | 1103883 A2 | 5/2000 |
| GB | 2341820 A | 3/2000 |
| JP | 3-63000777 A * | 1/1988 |
| WO | 92/09038 | 5/1992 |
| WO | 98/56131 | 12/1998 |
| WO | 00/73890 A1 | 12/2000 |

OTHER PUBLICATIONS

Handbook for the Palm V Organizer, copyright 1998, pp. 25-28.*

* cited by examiner

Primary Examiner—Matthew C. Bella
Assistant Examiner—Alex Liew
(74) Attorney, Agent, or Firm—Black Lowe & Graham PLLC

(57) ABSTRACT

An improved system and method for pen-based handwritten and keystroke data input into a computer system is disclosed. The system and method receives pen-based data entry from multiple related input boxes within a handwriting area on a digitizer pad. Thread-based processing allows each input box or group of input boxes to be separately evaluated, providing for continuous character recognition. Character strokes entered into each input box or group of input boxes are saved and interpreted together to allow more complete recognition of naturally written characters. Improvements on keyboard layouts are also disclosed.

9 Claims, 19 Drawing Sheets

| LETTERS | RECOGNIZABLE KEYSTROKES | | | | |
|---|---|---|---|---|---|
| A |  |  | | | |
| B |  |  | | | |
| C |  | | | | |
| D |  |  | | | |
| E |  |  |  | | |
| F |  |  |  |  | |
| G |  |  |  |  |  |
| H |  |  | | | |
| I |  |  | | | |
| J |  |  |  | | |
| K |  |  |  | | |
| L |  | | | | |
| M |  |  | | | |

| LETTERS | RECOGNIZABLE KEYSTROKES | | | | |
|---|---|---|---|---|---|
| N | N | N | | | |
| O | O | O | O | | |
| P | P | P | P | | |
| Q | Q | Q | Q | Q | |
| R | R | R | | | |
| S | S | | | | |
| T | T | T | T | | |
| U | U | U | U | | |
| V | V | | | | |
| W | W | | | | |
| X | X | X | X | | |
| Y | Y | Y | | | |
| Z | Z | Z | | | |

*Fig. 5B.*

| LETTERS | RECOGNIZABLE KEYSTROKES | | | |
|---|---|---|---|---|
| a | a | a | ∧ | |
| b | b | | | |
| c | c | | | |
| d | d | | | |
| e | e | ε | | |
| f | f | f | f | |
| g | g | g | | |
| h | h | | | |
| i | i | i | i | i |
| j | j | j | j | j |
| k | k | K | α | |
| l | L | | | |
| m | m | m | | |

*Fig. 6A.*

| LETTERS | RECOGNIZABLE KEYSTROKES | | | |
|---|---|---|---|---|
| *n* | ¹n | ¹n | | |
| *o* | ¹o | o₁ | | |
| *p* | ¹p | ¹|⊃² | ¹p | |
| *q* | q¹ | q¹ | | |
| *r* | ¹r | | | |
| *s* | S¹ | | | |
| *t* | ¹₂t | ²₁t | ¹²t | |
| *u* | ¹u | | | |
| *v* | ¹v | | | |
| *w* | ¹w | ¹w | | |
| *x* | ¹X² | ¹)(² | ¹X | ²X¹ |
| *y* | ¹y | ¹y | ¹y² | |
| *z* | ¹Z | ¹₂Z | | |

Fig. 6B.

| NUMBERS | RECOGNIZABLE KEYSTROKES | | | |
|---|---|---|---|---|
| 1 | 1 | | | |
| 2 | 2 | 2 | | |
| 3 | 3 | | | |
| 4 | 4 | 4 | | |
| 5 | 5 | 5 | | |
| 6 | 6 | | | |
| 7 | 7 | 7 | | |
| 8 | 8 | | | |
| 9 | 9 | | | |
| 0 | 0 | 0 | 0 | ∅ |

*Fig. 7.*

| SYMBOLS | RECOGNIZABLE KEYSTROKES | | | |
|---|---|---|---|---|
| ! | ↓ • | | | |
| " | ↑ ↑ | | | |
| # | ⌗ | ⌗ | | |
| $ | $ | | | |
| % | % | | | |
| & | & | & | | |
| ' | ↑ | | | |
| ( | ( | | | |
| ) | ) | | | |
| * | ✳ | ✳ | ✳ | ✳ |
| + | + | + | | |
| , | , | | | |
| - | — | | | |
| . | • | | | |
| / | / | | | |
| : | • • | | | |

Fig. 8A.

| SYMBOLS | RECOGNIZABLE KEYSTROKES | | | |
|---|---|---|---|---|
| ; | 1 •  2 ꜛ | | | |
| < | ¹ ⌞ | | | |
| = | ¹ —  ² — | | | |
| > | ¹ ⌟ | | | |
| ? | ¹ ?  ² • | | | |
| @ | @¹ | ¹@ | | |
| [ | ⌈₁ | | | |
| \ | ¹ \ | | | |
| ] | ⌉₁ | | | |
| ^ | ¹ ∧ | | | |
| _ | — ¹ | | | |
| \| | ↓¹ | | | |
| { | ε¹ | | | |
| } | ¹ ɜ | | | |
| ~ | ₁∼ | | | |

*Fig. 8B.*

SYSTEM AND METHOD OF PEN-BASED DATA INPUT INTO A COMPUTING DEVICE

PRIORITY CLAIM

This application claims priority from earlier filed U.S. Provisional Patent Application Ser. No. 60/295,067 filed May 31, 2001 and U.S. Provisional Patent Application Ser. No. 60/305,385 filed Jul. 13, 2001.

FIELD OF THE INVENTION

This invention relates generally to data input into a computer system and, more specifically, to a system and method for pen-based handwritten and keystroke data input into a personal digital assistant.

BACKGROUND OF THE INVENTION

Given the increasing demand for mobile computing, the last decade has seen a surge in the number and types of portable or handheld computer devices. Frequently referred to as Personal Digital Assistants or PDAs, these computer devices are largely designed to function as electronic notepads, address books, daily planners and the like. As computer hardware technology has improved and miniaturized, PDAs have become increasing smaller, lighter and faster.

One tradeoff to the reduced size of PDAs is their inability to accommodate traditional keyboard-based, touch-typing data entry. Given the nature of the typically hand-held PDA, together with the physical constraints of a small viewing and data input area, keyboards are generally unacceptable as a means of data entry. As a result, many PDAs use a pen and digitizer pad combination for data input. This arrangement allows a user to hold the PDA in one hand while at the same time inputting data via the digitizer pad using the pen. PDAs have long been used for pen-based keystroke input of characters, for example, by using the pen to press icon representations of characters located on a "QWERTY" keyboard layout. More recently, PDAs have included pen-based handwritten character entry. Handwriting recognition engines have been provided that convert the user's handwriting into a machine readable format.

While both keystroke and handwritten character entry have become increasingly embraced as workable options for PDAs, there remain disadvantages with both types of PDA data entry. Character keyboards provided with PDAs have been based on a traditional QWERTY keyboard layout. But in light of the inability to use two hands to type on PDAs, there is little advantage to preserving this format over superior keyboard layouts. In addition, the traditional QWERTY keyboard layout does not efficiently provide for the inclusion of frequently used complementary characters such as numbers and certain symbols. Finally, PDAs using keyboard-based data entry fail to provide convenient and efficient movement between various keyboard options.

There are likewise disadvantages with existing PDA handwriting systems. Historically it has been very difficult to teach a computer system all of the nuances associated with interpreting a user's handwritten words. Lacking the technological resources to provide full context referencing, PDA handwriting recognition systems have relied instead almost solely on the writer's input strokes to evaluate each character separately. Natural human handwriting, however, is inherently complex, and typically involves multiple strokes to complete each character. Due to database and processor limitations, traditional PDA handwriting systems have great difficultly evaluating characters consisting of multiple strokes. Thus, rather than analyze the natural manner in which most writers produce characters, PDA handwriting manufacturers have promoted the use of short-hand or other abbreviated forms of handwriting wherein each character is represented by a single, typically simple stroke. While this approach has improved the overall accuracy of PDA handwriting systems, it has come as the expense of the user, who is now forced to learn a new language to effectively use the PDAs. In addition, PDAs historically suffer from processor delays or lag associated with handwritten data input. PDA handwriting systems are largely unable to keep pace with handwriting input. Finally, many PDA handwriting recognition systems rely heavily on the use of mode keys, which require additional strokes, to distinguish between upper and lower case letters, numbers and symbols.

Thus, there is a need for an improved system and method for pen-based handwritten and keystroke data input into a PDA that overcomes the noted disadvantages with existing systems.

SUMMARY OF THE INVENTION

An improved system and method for pen-based handwritten and keystroke data input into a computer system is disclosed. The system and method receives pen-based data entry from multiple related input boxes within a handwriting area on a digitizer pad. Character strokes are received into each input box or group of input boxes and are preferably saved and interpreted together to allow more complete recognition of naturally written characters. Thread-based processing is used to allow separate and concurrent evaluation of character strokes, providing for continuous character recognition.

A method is disclosed for processing handwritten character strokes entered into a computer system by a user. First and second handwriting areas for receiving alphabetic letter strokes are provided. A third handwriting area for receiving number and symbol strokes is also provided. Handwritten character strokes entered into the first, second and third handwriting areas are received and interpreted. Handwritten character strokes entered into the first and second handwriting areas are interpreted as alphabetic characters but not as number or symbol characters. Handwritten character strokes entered into the third handwriting area are interpreted as number or symbol characters but not as alphabetic characters.

In an alternative embodiment, handwritten character strokes entered into one or more handwriting areas are interpreted as upper case or lower case characters, depending upon where they are input. In yet another alternative embodiment, handwritten character strokes entered into one or more handwriting areas are interpreted as numbers or symbols, depending upon where they are input.

In an alternative embodiment, an improved alphanumeric keyboard layout is disclosed having an alphabetically sequential organization of alphabetic characters along a plurality of rows and a grid of numerals displayed within a subset of the digitizer pad.

As will be readily appreciated from the foregoing summary, the invention provides an improved and more efficient system and method for recognizing and processing pen-based handwritten and keystroke data input into a computer system.

BRIEF DESCRIPTION OF THE DRAWINGS

The preferred and alternative embodiments of the present invention are described in detail below with reference to the following drawings.

FIGS. 5A and 5B illustrate the pen strokes recognized by the present invention that are used to represent the twenty-six upper case letters of English Alphabet.

FIGS. 6A and 6B illustrate the pen strokes recognized by the present invention that are used to represent the twenty-six lower case letters of English Alphabet.

FIG. 7 illustrates the pen strokes recognized by the present invention that are used to represent Roman Numerals "0" through "9".

Figure 8A:
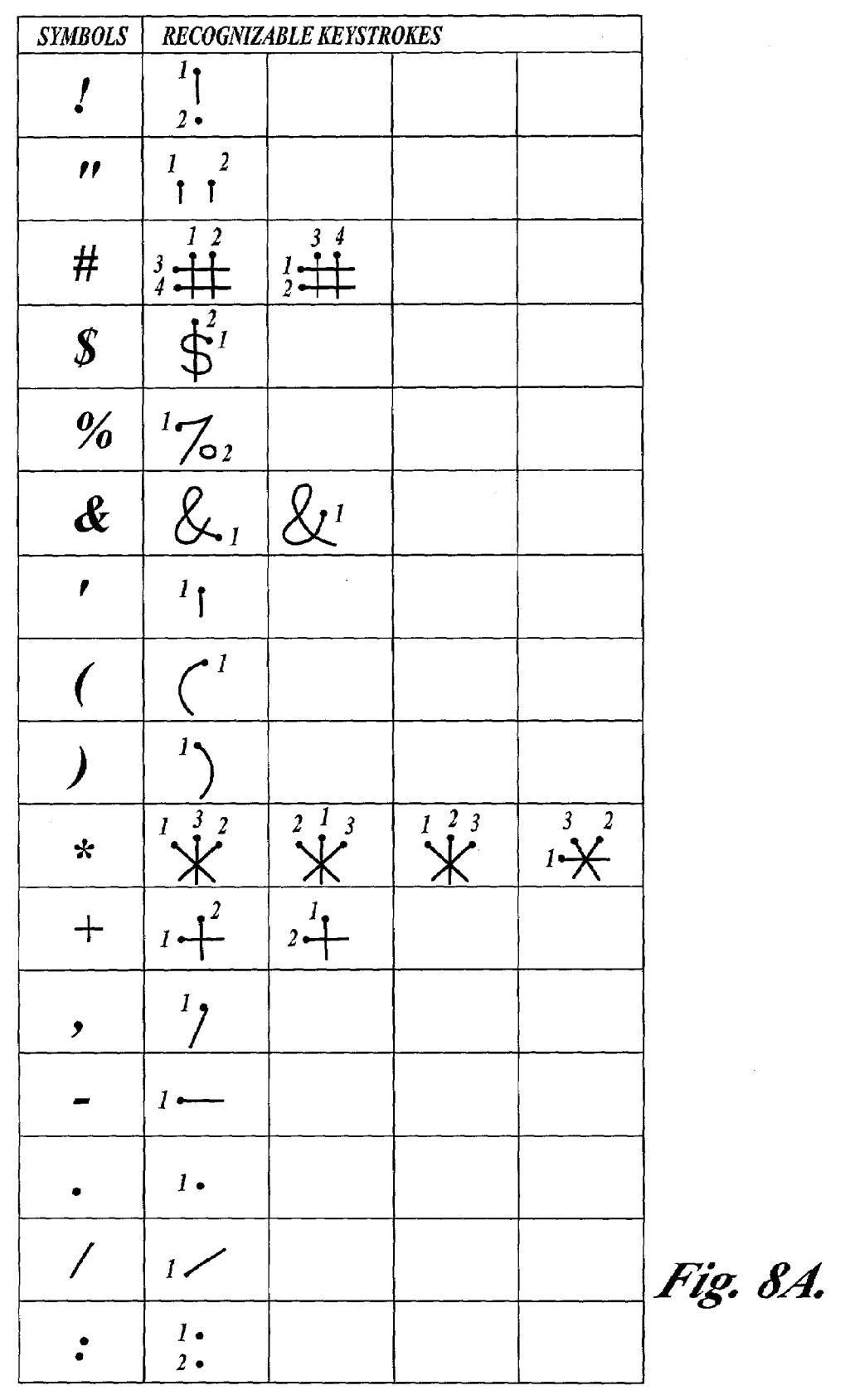

FIGS. 8A and 8B illustrate the pen strokes recognized by the present invention that are used to represent various symbols.

DETAILED DESCRIPTION OF THE PREFERRED EMBODIMENT

Figure 1:
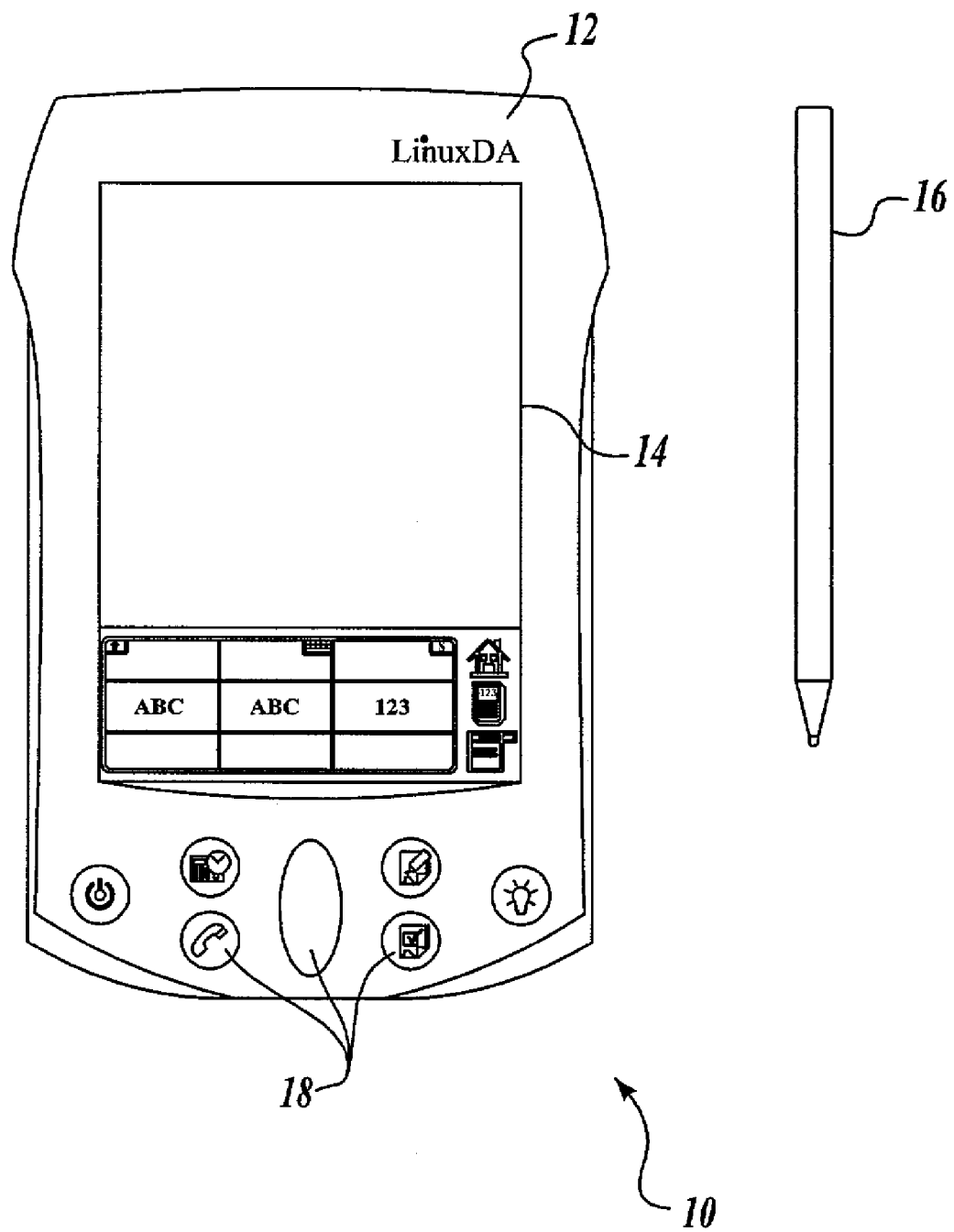
FIG. 1 is a pen-based PDA made according to an embodiment of the present invention.

The present invention is directed to a system and method for pen-based handwritten and keystroke data input into a computer system. As illustrated with reference to FIG. 1, a preferred computer system 10 utilizing pen-based data input minimally includes a handheld or portable computer such as a Personal Digital Assistant (PDA) 12 having a digitizer pad 14, a data entry pen 16 and optionally one or more buttons 18 located on the PDA 12 used to selectively alter the functionality of the PDA. The pen and digitizer pad combination allow a user to hold the PDA 12 in one hand while using the pen 16 to input handwritten or keystroke data via the digitizer pad 14.

Figure 2:
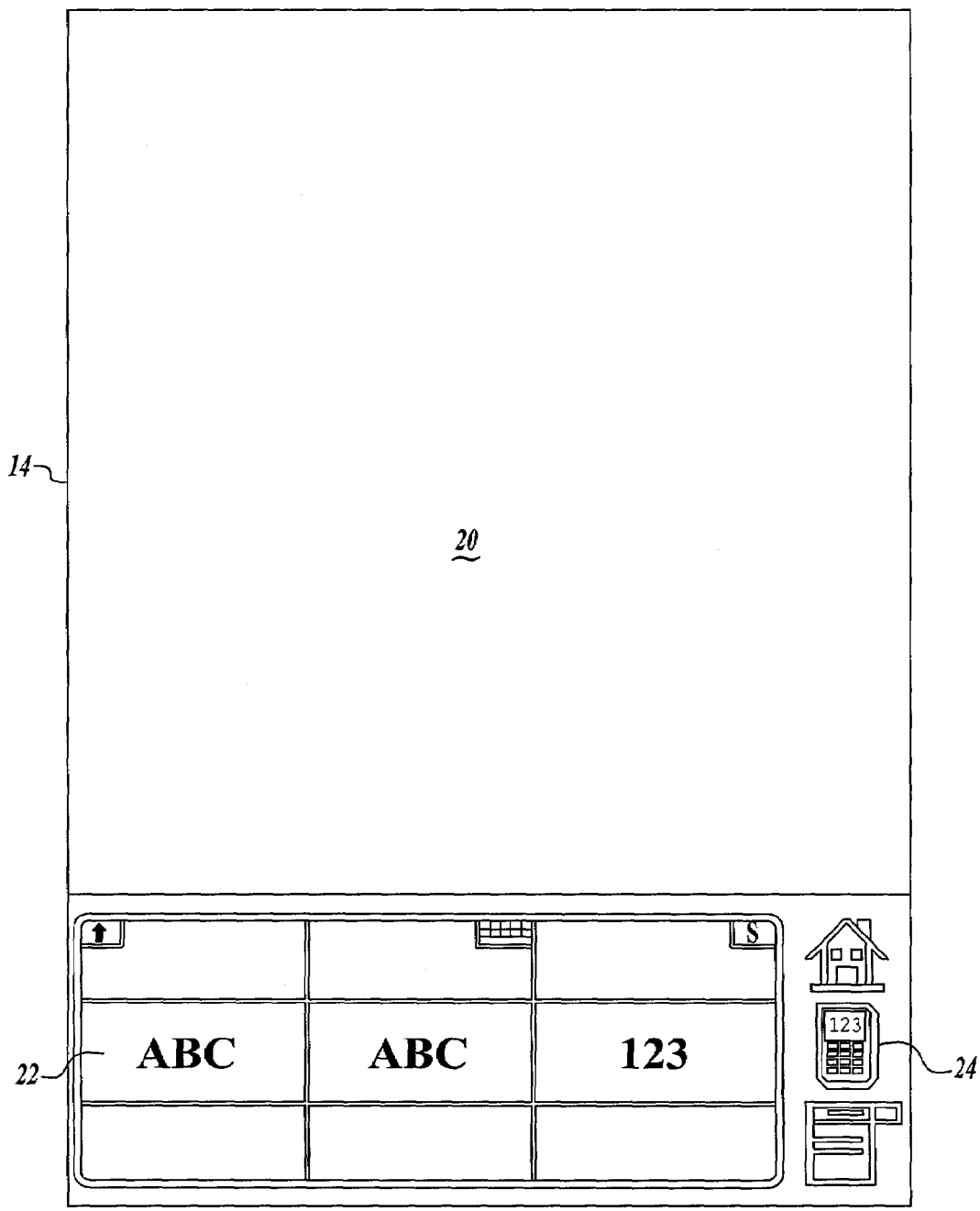
FIG. 2 shows a digitizer pad of the pen-based PDA made according to an embodiment of the present invention wherein a handwriting input area of the digitizer pad includes a 3×3 matrix grid of handwriting boxes.

The digitizer pad 14 of the present invention is preferably divided into two or more areas according to the predetermined functionality of the PDA 12. As shown with reference to FIG. 2, a preferred digitizer pad 14 includes a viewing area 20, a handwriting input area 22 and a function-selector area 24. While the viewing area 20 and the handwriting input area 22 are primarily used for the noted functions (i.e., viewing, handwriting input), either area may be independently used as a viewing or data input area. The relative location, size, shape and overall layout of the areas can be modified to accommodate the size, shape and design of the PDA 12.

Data is preferably input into the PDA 12 via the digitizer pad 14 by means of the data entry pen 16. The present invention discloses two principal ways of data input: handwritten and keystroke.

Handwritten Data Input

To facilitate handwritten data input, the handwriting input area 22 is preferably divided into a matrix grid of handwriting boxes. In the preferred embodiment, the handwriting input area 22 may be used in one of two user-selectable configurations: a 1×3 matrix grid consisting of a single row and three columns 30, 32 and 34 (FIG. 3) and a 3×3 matrix grid consisting of three rows (a, b, c) in addition to the three columns 30, 32 and 34 (FIG. 4). In either configuration, the handwriting area 22 preferably includes three icons 36, 38 and 40: an "up arrow" icon located in the top left side of the handwriting area 22; a "keyboard" icon located in the top middle of the handwriting area 22; and an "S" icon located in the top right side of the handwriting area 22. The number of icons, their location within the handwriting area 22 and the appearance of the icons may vary. The functionality of "keyboard" icon 38 remains the same regardless of the configuration; it is used to activate the keystroke data input option (discussed below). The functionality of the "up arrow" icon 36 and the "S" icon 40 depend upon the input area 22 grid configuration. One or more of the resulting handwriting boxes is used, either singly or in combination with other handwriting boxes, to provide handwriting recognition according to a preferred handwriting recognition pattern.

Figure 3:
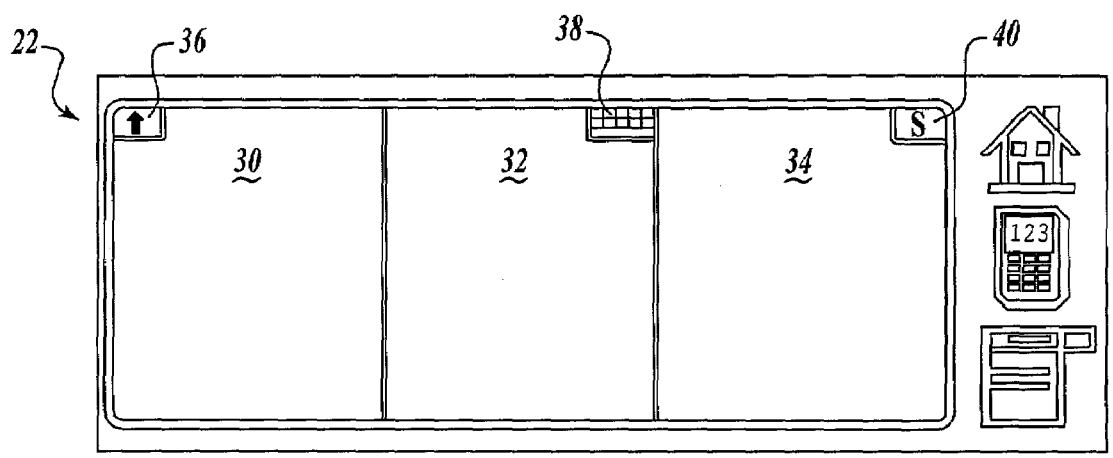
FIG. 3 shows an embodiment of the present invention wherein the handwriting input area of the digitizer pad includes a 1×3 matrix grid of handwriting boxes.
Figure 4:
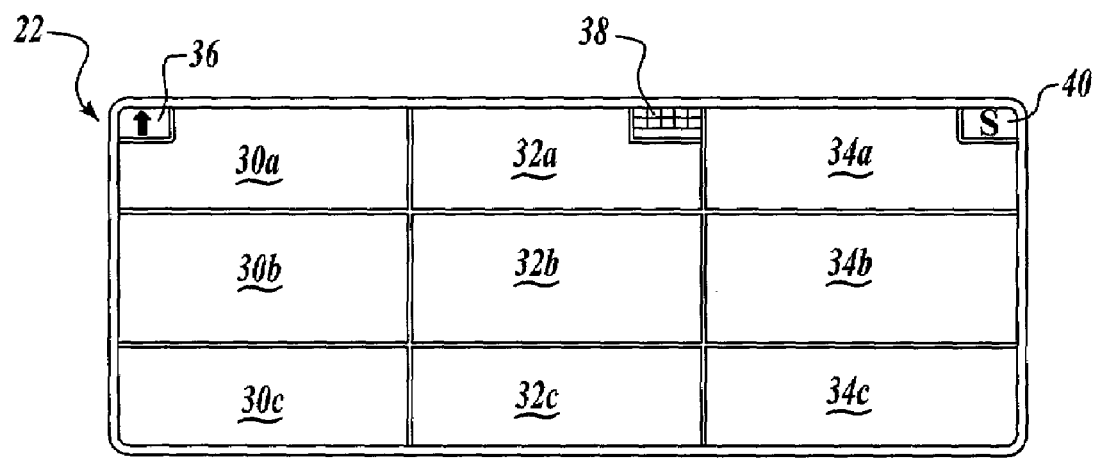
FIG. 4 shows an embodiment of the present invention wherein the handwriting input area of the digitizer pad includes a 3×3 matrix grid of handwriting boxes.

With reference to FIG. 3, the preferred handwriting recognition pattern of the 1×3 grid configuration of the handwriting input area 22 uses the handwriting boxes as follows:

Upper Case and Lower Case Letters: Boxes 30 and 32
Numbers/Symbols: Box 34

Handwritten letters are placed in the handwriting boxes 30 and 32, while numbers and symbols are places in box 34. In this configuration, the "up arrow" icon 36 is used as an upper case/lower case letter toggle. In the "upper case" mode, the PDA 12 recognizes letters written in boxes 30 and 32 as upper case letters. In the "lower case" mode, the PDA 12 recognizes letter written in the boxes 30 and 32 as lower case letters. The "S" icon 40 is used as a number/symbol toggle switch. In the "number" mode, the PDA 12 recognizes data input into the box 34 as Arabic numbers. In the "symbol"

mode, the PDA 12 recognizes data input into the box 34 as symbols, such as ".", ";" or "&".

Figure 3A:
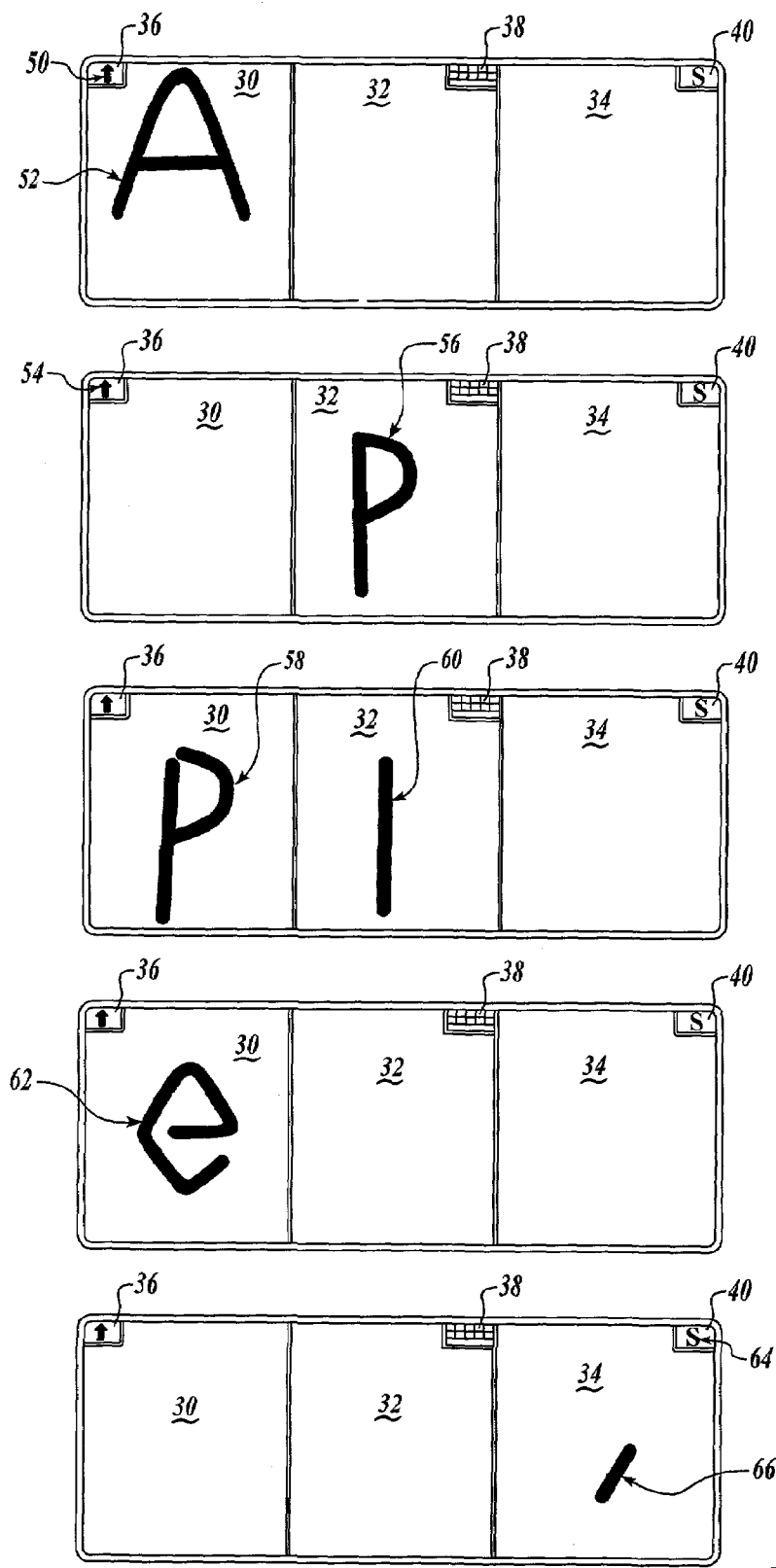
FIG. 3A illustrates the operation of a handwriting recognition engine according to an embodiment of the present invention wherein the handwriting input area of the digitizer pad includes a 1×3 matrix grid of handwriting boxes.

By way of example, the operation of the 1×3 grid configuration to write "Apple," is described with reference to FIG. 3A. Each toggle switch or character entry is described for purposes of this example as a "stroke," such as from the data entry pen 16. As explained below, each character entry may consist of one or more pen strokes entered by the user.

With stroke 50, the user toggles the "up arrow" icon 36 to place boxes 30 and 32 into "upper case" mode. With stroke 52, the user writes an "A" in box 30. The PDA 12 recognizes entry of the upper case letter "A". With stroke 54, the user toggles the "up arrow" icon 36 to place boxes 30 and 32 into "lower case" mode. With stroke 56, the user writes a "p" in box 32, which the PDA 12 recognizes as a lower case "p". With stroke 58, the user writes a "p" in box 30, which the PDA 12 recognizes as a lower case "p". With stroke 60, the user writes an "1" in box 32, which the PDA 12 recognizes as a lower case "1". With stroke 62, the user writes an "e" in box 30, which the user recognizes as a lower case "e". With stroke 64, the user toggles the "S" icon 40 to place box 34 in "symbol" mode. With stroke 66, the user writes a "," in box 34. The PDA 12 recognizes entry of the symbol for a comma. In the preferred embodiment, with each stroke, the PDA 12 reproduces the indicated character in the viewing area 20 of the digitizer pad 14 to form "Apple,".

With reference to FIG. 4, the preferred handwriting recognition pattern of the 3×3 grid configuration of the handwriting input area 22 uses the handwriting boxes as follows:

Upper Case Letters: Combination of boxes 30a and 30b
   Combination of boxes 32a and 32b
Lower Case Letters: Combination of boxes 30b and 30c
   Combination of boxes 32b and 32c
Numbers: Combination of boxes 34a and 34b
Symbols: Combination of boxes 34b and 34c Handwritten letters are placed in a combination of handwriting boxes 30a,b,c and 32a,b,c; numbers are placed in a combination of handwriting boxes 34a,b, and symbols are placed in a combination of handwriting boxes 34b, c.

In the 3×3 grid configuration, there is no need to use the "up arrow" icon 36 to toggle between upper case and lower case letter modes because the PDA 12 recognizes upper case and lower case letters depending upon the combination of handwriting boxes used in writing the characters. Likewise, there is no need to use the "S" icon 40 to toggle between number and symbol modes because the PDA 12 recognizes numbers or symbols depending upon the combination of handwriting boxes used in writing the characters.

Figure 4A:
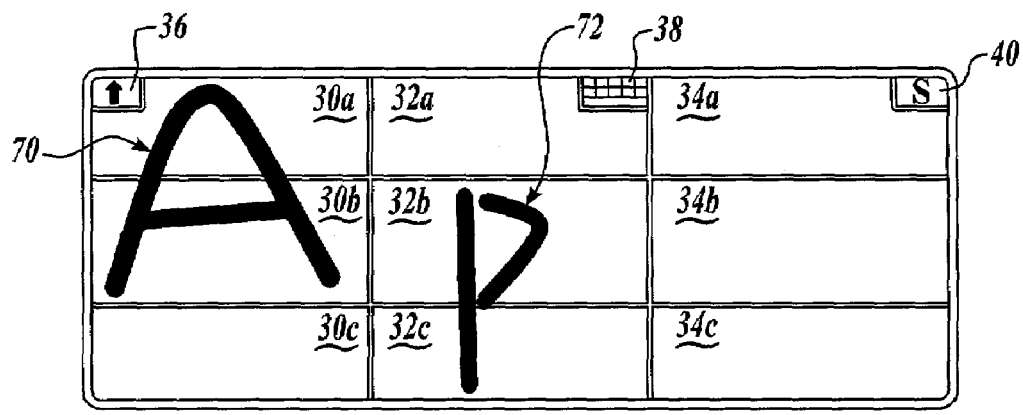
FIG. 4A illustrates the operation of a handwriting recognition engine according to an embodiment of the present invention wherein the handwriting input area of the digitizer pad includes a 3×3 matrix grid of handwriting boxes.
Figure 4A:
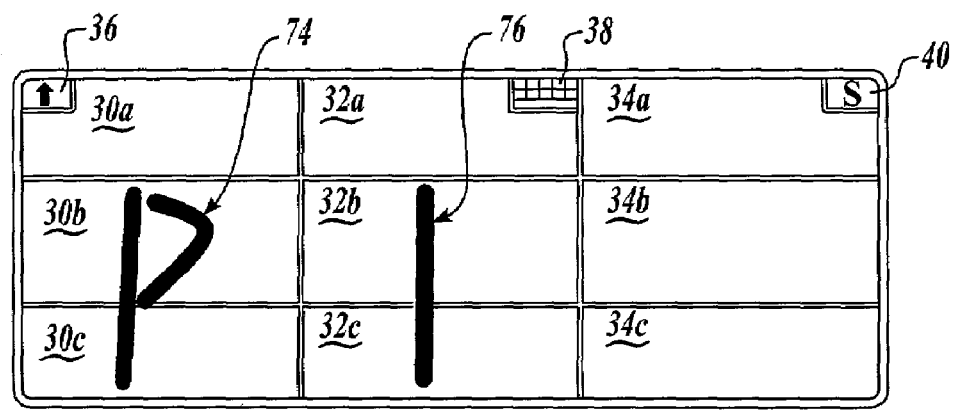
Figure 4A:
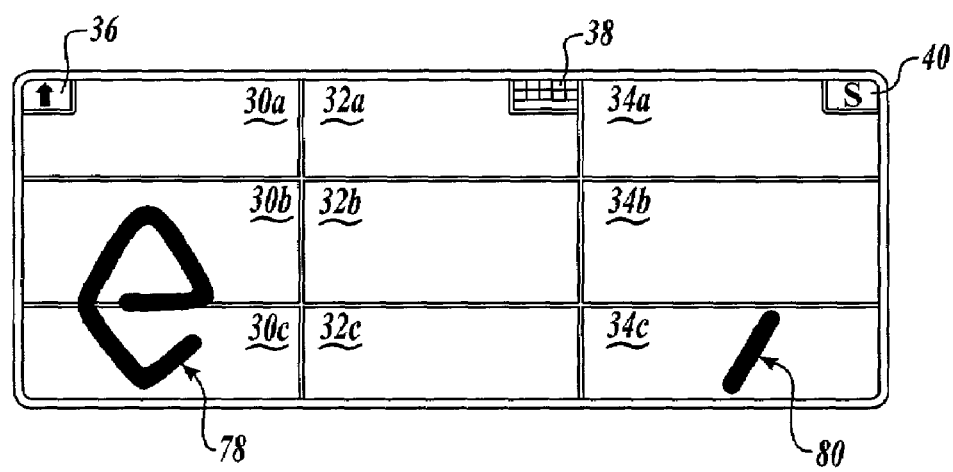
Figure 5A:
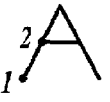
Figure 5A:
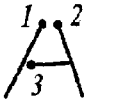
Figure 5A:
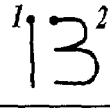
Figure 5A:
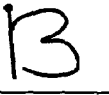
Figure 5A:
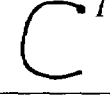
Figure 5A:
Figure 5A:
Figure 5A:
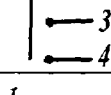
Figure 5A:
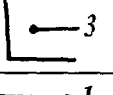
Figure 5A:
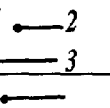
Figure 5A:
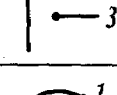
Figure 5A:
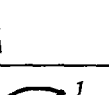
Figure 5A:
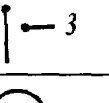
Figure 5A:
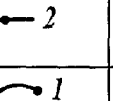
Figure 5A:
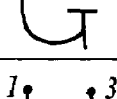
Figure 5A:
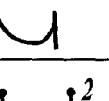
Figure 5A:
Figure 5A:
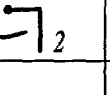
Figure 5A:
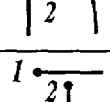
Figure 5A:
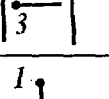
Figure 5A:
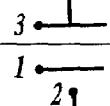
Figure 5A:
Figure 5A:
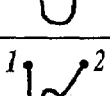
Figure 5A:
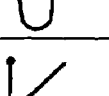
Figure 5A:
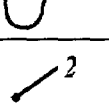
Figure 5A:
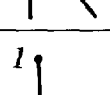
Figure 5A:
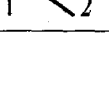
Figure 5A:
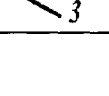
Figure 5A:
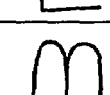
Figure 5A:
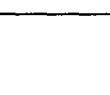
Figure 5A:
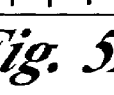
Figure 5A:
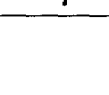

By way of example, the operation of the 3×3 grid configuration to write "Apple," is described with reference to FIG. 4A. Each character entry is described for purposes of this example as a "stroke," such as from the data entry pen 16. As explained below, each character entry may consist of one or more pen strokes entered by the user.

With stroke 70, the user writes an "A" in combined boxes 30a and 30b. The PDA 12 recognizes entry of the upper case letter "A". With stroke 72, the user writes a "p" in combined boxes 32b and 32c, which the PDA 12 recognizes as a lower case "p". With stroke 74, the user writes a "p" in combined boxes 30b and 30c, which the PDA 12 recognizes as a lower case "p". With stroke 76, the user writes an "1" in combined box 32b and 32c, which the PDA 12 recognizes as a lower case "1". With stroke 78, the user writes an "e" in combined boxes 30b and 30c, which the user recognizes as a lower case "e". With stroke 80, the user writes a "," in combined boxes 34b and 34c. The PDA 12 recognizes entry of the symbol for a comma. In the preferred embodiment, with each stroke, the PDA 12 reproduces the indicated character in the viewing area 20 of the digitizer pad 14 to form "Apple,".

The continuous handwriting entry and recognition system of the present invention is further described as follows. The PDA 12 operates a handwriting recognition engine, which is dedicated to converting handwritten data input from the handwriting input area 22 into corresponding letters, numbers or symbols. Continuous handwriting entry and recognition utilizing multiple handwriting boxes is preferably accomplished through the use of processing threads associated with each handwriting recognition box and collectively participating in a thread group.

A thread is a semi-process that has its own stack and executes a given piece of code, or program instruction. Unlike with real processes, for which different memory areas are typically set aside for each separate process, threads normally share their memory with other threads. Thus, threads can access many of the same processing reference assets, such as the same global variables, the same heap memory and the same set of file descriptors. A thread group is a set of threads executing inside the same process. Such threads execute in parallel by using processor time slices.

There are several advantages with the use of thread groups. As opposed to a typical serial program, with a thread group, several operations may be carried out in parallel. This enables multiple processing events to be handled immediately as they arrive. For example, in the present context, one thread is preferably assigned to handle a user interface while another thread is assigned to handle database queries. This enables the PDA 12 to respond to user data input (such as displaying a character on the viewing area 22) corresponding to entry of a first handwritten character in one handwriting box while executing a database query to determine the character corresponding to a second handwritten character in another handwriting box.

Thread groups provide further advantages associated with context switching. Context switching refers to the ability of and efficiency with which a system can switch between operations. Context switching between threads within a thread group is much faster than context switching between processes in a process group. Finally, communication between multiple threads is usually faster and easier to implement than communications between multiple processes.

In the present invention, separate threads within a thread group are assigned to each handwriting box or combination of related handwriting boxes, as well as to provide user feedback, database query and other operations. As a result, the PDA 12 of the present invention is able to recognize, process and display the results of data handwritten in one box while recognizing handwritten data from a second box. For example, with both the 1×3 and 3×3 handwriting configurations, the user is able to continuously write alphabetic characters in one or more boxes in columns 30 and 32 without waiting for the handwriting recognition engine of the PDA 12 to complete the recognition process because different threads process entries in the different handwriting boxes or combination of handwriting boxes. This significantly reduces the delay or lag associated with processing each handwritten character that is present with traditional pen-based PDA systems, and allows faster and more efficient entry of handwritten user data.

The handwriting engine of the present invention facilitates superior recognition of characters written using natural human handwriting rather than short-hand or other abbreviated forms of handwriting traditionally used with pen-based PDAs. By using multi-threaded processes wherein each dedicated writing area invokes a new thread, the handwriting engine of the present invention is able to perform expanded processing without incurring noticeable responsive time delays or lags.

One of the ways in which the handwriting engine performs expanded processing relates to its evaluation of multiple pen strokes associated with each entered handwritten character. The natural way of writing many characters involves more than one stroke, separated by both space and time. For example, a typical way of handwriting a upper case letter "A" may involve either two or three separate pen strokes. The handwriting engine of the present invention evaluates all separate pen strokes written in each handwriting block or combination of handwriting blocks within a predetermined period of time. This allows the handwriting engine to examine multiple strokes associated with characters when attempting to recognize the character. By recognizing naturally written characters, the present invention simplifies handwritten data entry and reduces the learning curve for users of the PDA 12. FIGS. 5-8 illustrate the naturally written characters recognized by the handwriting engine of the present invention, many of which involve multiple pen strokes.

Figure 9:
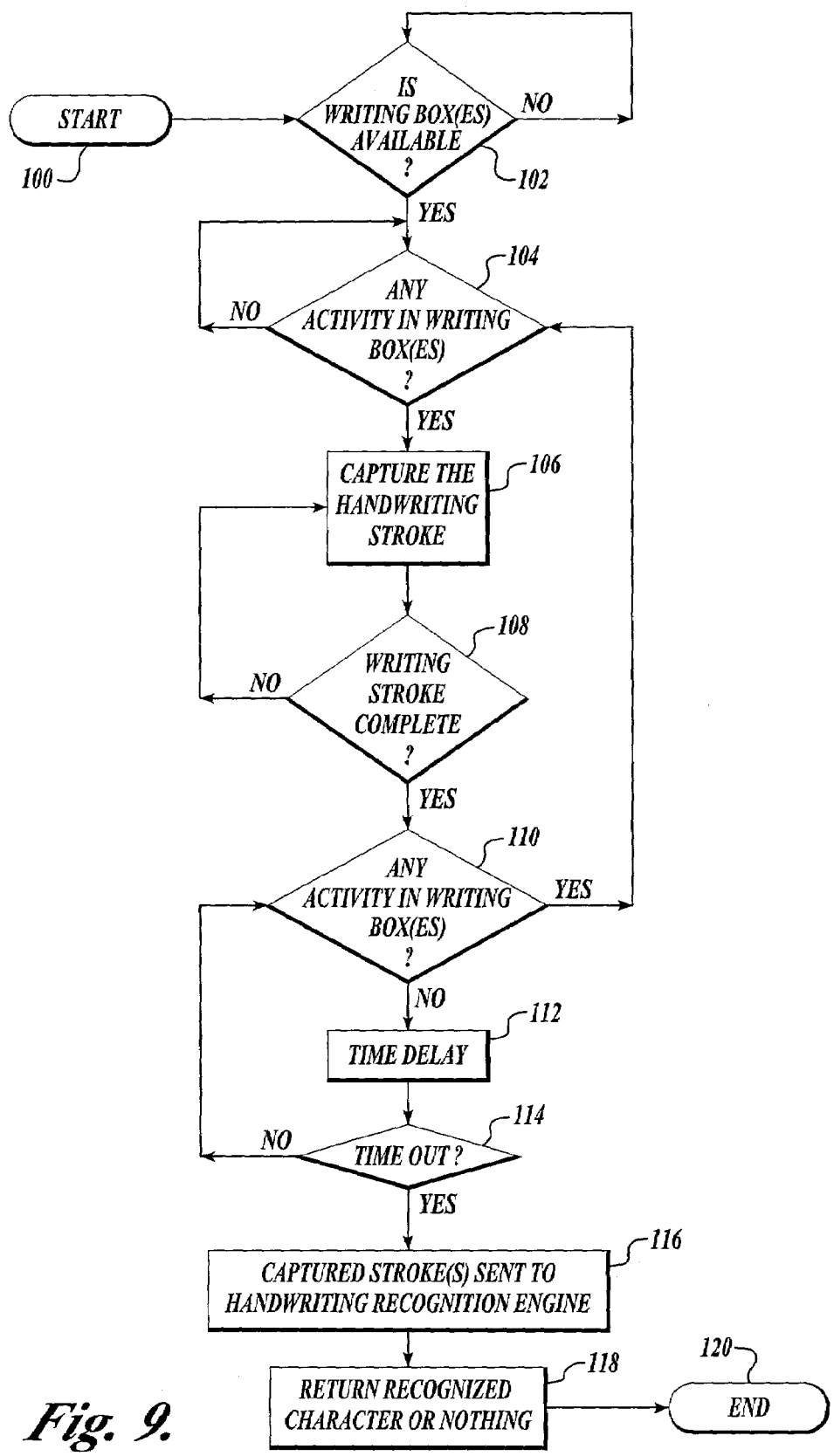
FIG. 9 is a flowchart showing the operational logic of the preferred handwriting recognition engine of the present invention.

A preferred method by which the handwriting engine of the present invention processes handwritten characters is described with reference to FIG. 9. FIG. 9 is a flowchart illustrating the multi-thread process of the handwriting engine used to evaluate a character handwritten into a handwriting box or combination of handwriting boxes in either of the preferred 1×3 or 3×3 grid configurations. The thread group is initiated at block 100. At decision block 102, the logic determines if a particular handwriting box or combination of handwriting boxes is available. With reference to FIG. 3, for example, whether alphabetic handwriting box 30 is available to receive data input. If the handwriting box or combination of handwriting boxes is unavailable, the logic repeats itself at decision block 102 until the status changes. If the handwriting box or combination of handwriting boxes is available, the logic proceeds to decision block 104.

At decision block 104, a determination is made whether there is any activity in the handwriting box or combination of handwriting boxes. In the preferred embodiment of the present invention, activity would correspond to a pen stroke using the data entry pen 16 on the data input area 22 of the digitizer pad 14. If there is no handwriting activity, the logic repeats itself at decision block 104. If there is activity in the handwriting box or combination of handwriting boxes, the logic proceeds to block 106. At block 106, a thread is initiated to capture the handwriting stroke in the handwriting box or combination of handwriting boxes. In the preferred embodiment, the handwriting stroke consists of a pen stroke using the data entry pen 16. At block 106, the thread begins capturing immediately upon initiation of the pen stroke, and stores the results in a memory of the PDA 12 associated with the handwriting recognition engine. The particular handwriting box or combination of handwriting boxes is now designated as unavailable. The logic continues to decision block 108, where a determination is made whether the initiated pen stroke has ceased, or in other words whether the data entry pen 16 has been removed from the handwriting box or combination of handwriting boxes in the data input area 22. If the writing stroke is not complete, the logic returns to block 106, where the capture of the pen stroke continues until the stroke is compete. If the pen stroke is complete, as preferably indicated by removal of the data entry pen 16 from the handwriting box or combination of handwriting boxes in the data input area 22, the logic proceeds to decision block 110.

At decision block 110, a determination is made whether any further activity has been commenced in the handwriting box or combination of handwriting boxes. If so, the logic returns to decision block 104, where the stroke capture routine is repeated for the next stroke. If there is no further activity, the logic proceeds to block 112, which implements a timer function providing a predetermined time delay preferably based on the time that has elapsed since the first pen stroke was completed. This time delay allows the handwriting recognition engine to monitor the handwriting box or combination of handwriting boxes for additional pen strokes related to a character typically written using more than a single pen stroke. A preferred time delay between pen strokes related to the same character is approximately 0.3 second. At decision block 114, a determination is made whether the time delay has timed out, or in other words, whether the user has initiated additional pen strokes associates with the handwritten character to be recognized. If the time delay has not timed out, the logic returns to decision block 110 and, if appropriate, subsequently to the stoke capture routine. If the time delay has timed out, the presumption is that the user has completed all strokes related to the handwritten character to be recognized, and the logic proceeds to block 116.

At block 116, the stroke or strokes representing the handwritten character to be recognized that are stored in the memory of the PDA 12 are sent to the handwriting recognition engine. This preferably initiates a new thread involved in querying the handwriting database. At block 118, the thread returns the results of the query, which is either a recognized character or nothing if the character is not recognized. The results are preferably displayed in the viewing area 20 of the digitizer pad 14. This process may involve initiating a new thread. The particular handwriting box or combination of handwriting boxes is now designated as unavailable.

The 3×3 grid configuration (FIGS. 4 and 4A) provides further advantages beyond the 1×3 grid configuration. As explained above, by having a 3×3 grid, a combination of boxes can be used to recognize different handwriting patterns. Unique combinations are designed to identify and capture upper case letters or lower case letters, numbers or symbols. This reduces the number of separate pen strokes required to input the same natural characters, resulting in improved handwriting recognition efficiencies. By way of example, a user entering "Apple," into a 1×3 grid uses nine pen strokes (assuming for the sake of comparison only a single pen stroke per character). The same user entering "Apple," into a 3×3 grid uses only six pen strokes. In this example, the difference relates to use of the "up arrow" icon 36 to change modes between upper case and lower case letters for the "A" and the "p" characters, as well as use of the "S" icon 40 to change modes between the default (in the preferred embodiment) number mode and the symbol mode. The 3×3 grid configuration provides different combinations of additional boxes sized to provide adequate if not the same writing area upon which to write characters. As a result, the handwriting recognition engine does not have to rely on the icons to recognize altered character modes. In other words, the user does not have to change back and forth between the upper case letter and lower case letter, or number and symbol recognition modes. This in turn further reduces the time necessary to input handwritten characters.

Figure 10:
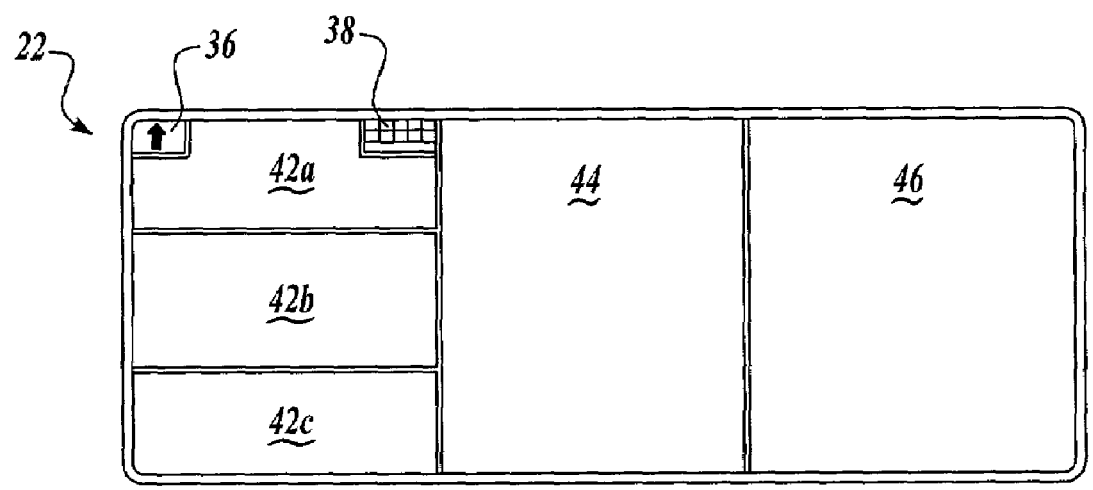
FIG. 10 shows an embodiment of the present invention wherein the handwriting input area of the digitizer pad includes three columns, one of which includes multiple handwriting boxes.

Further variations on the type of grid configuration used with the handwriting recognition engine of the present invention are contemplated. For example, as shown in FIG. 10, the handwriting input area 22 may be divided into a three column configuration having column 42 for letters, a column 44 for numbers and a column 46 for symbols. Column 42 is further divided into boxes 42a,b,c. In this configuration, letters are entered using alternating combinations of boxes 42a and 42b, 42b and 42c. The "up arrow" icon 36 is used as the upper case/lower case letter toggle. The functionality of "keyboard" icon 38 is used to call up the keyboard option for data entry (discussed below). Boxes 44 and 46 are used for handwritten input of numbers and symbols, respectively. By using multiple boxes for character entry, as well as for numbers and symbols, this configuration reduces delays or lag associated with returning character recognition results. In yet another variation, the combination of boxes 42a and 42b, and 42b and 42c, are used to enter upper case letters and lower case letters, respectively. This configuration eliminates the need to toggle between upper and lower case letters using the "up arrow" icon 36.

Keystroke Data Input

Figure 11:
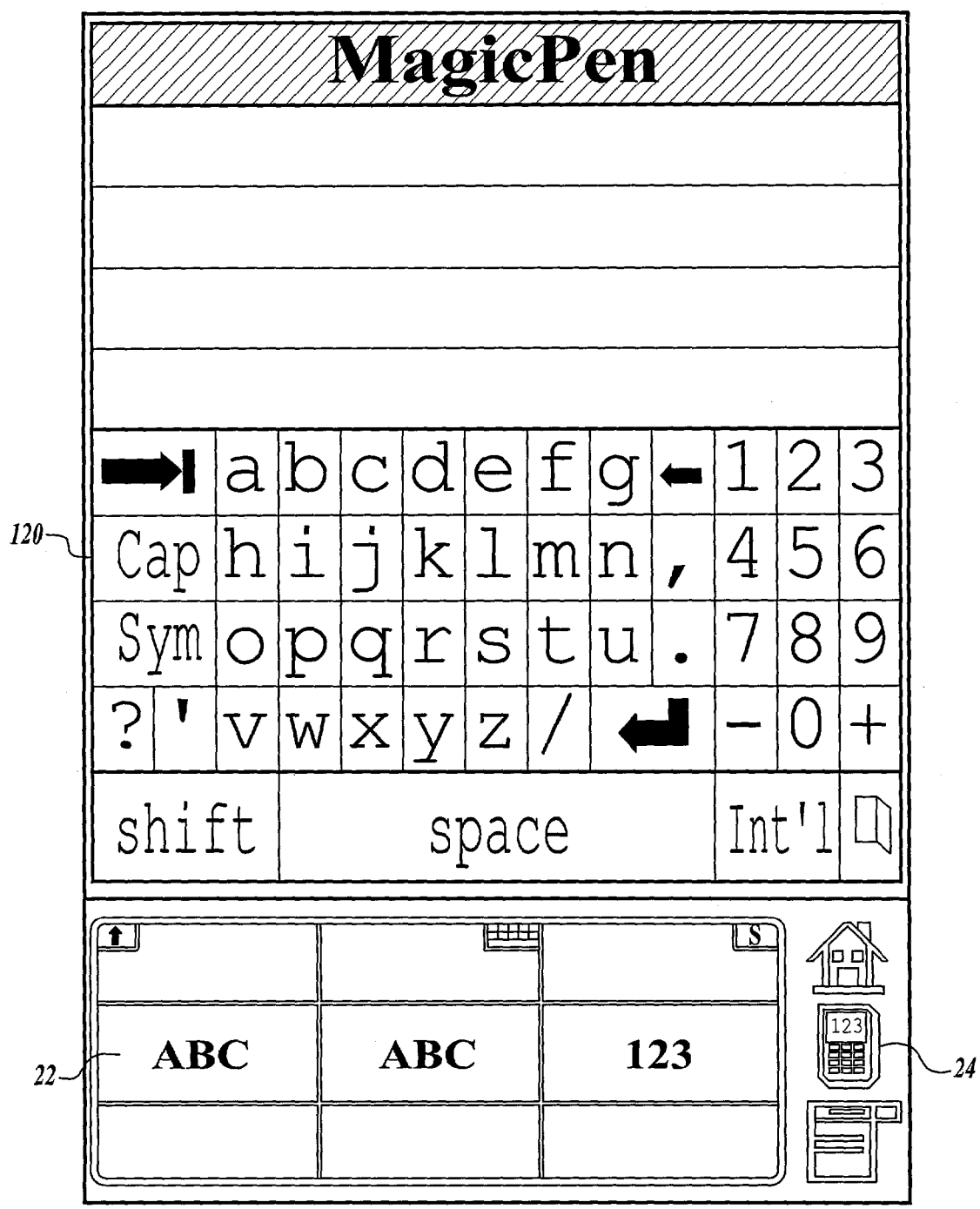
FIG. 11 shows a digitizer pad made according to an embodiment of the present invention wherein a viewing area of the digitizer pad includes a keyboard layout.

The present invention provides additional advantages related keystroke data entry. In addition to handwritten data entry, the PDA 12 of the present invention provides improvements in the use of the data entry pen 16 to select character icons or keys located on the digitizer pad 14. By toggling the "keyboard" icon 38, a keystroke option for data entry is selected. As illustrated with reference to FIG. 11, in the preferred embodiment, this produces a keyboard representation in the viewing area 20. Preferably, the keyboard representation 120 occupies approximately one-half of the viewing area 20, leaving the remaining portion of the viewing area 20 visible for the display of characters selected by keystroke data input.

Figure 12:
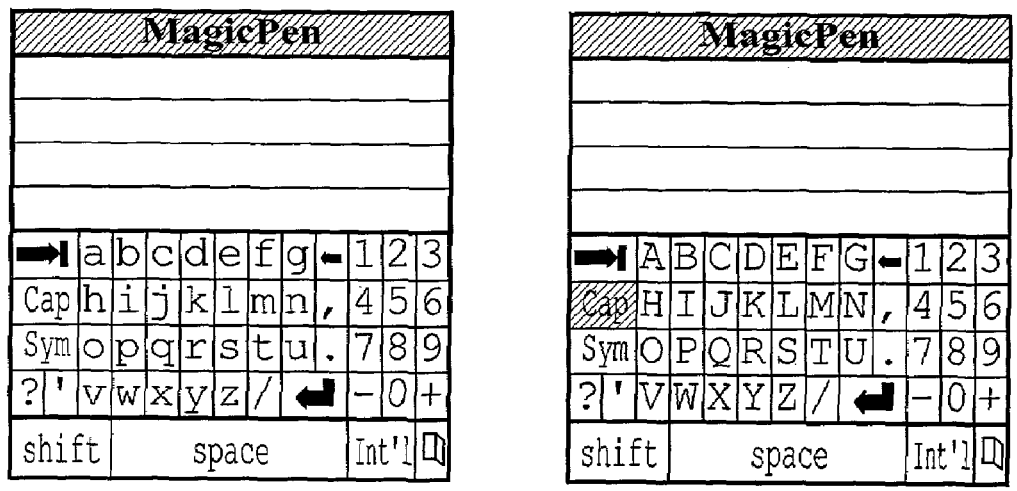
FIG. 12 shows an upper case and lower case "Natural" keyboard layout made according to an embodiment of the present invention.

More specifically with reference to FIG. 12-15, a preferred embodiment of the improved keyboard layout of the present invention is described. FIG. 12 illustrates the layout of both the upper case and lower case options of the "Natural" keyboard. The alphabet characters are laid out in sequential order, from top to bottom, preferably consisting of characters "a" to "g" on the first row; characters "h" to "n" on the second row; characters "o" to "u" on the third row; and characters "v" to "z" on the fourth row. In the Natural keyboard, numbers "0" to "9" are organized as in traditional adding machines and calculators to facilitate ease of reference, and are oriented on the right side of the keyboard layout. Some of the most frequently used symbols are interspaced around the edges of the alphabet character rows and between the alphabet character rows and the number grid. The "Cap" key is used to alternate between the upper case and lower case keyboard options, as shown. The Natural keyboard further includes two keys, shown in FIG. 12 as the "Sym" and "Int'l" keys, which are dedicated to toggling between variations on the improved keyboard layout of the present invention. The functionality of these keys will be discussed below. Finally, the keyboard includes a "door" icon to exit the keyboard option for data entry.

Figure 13:
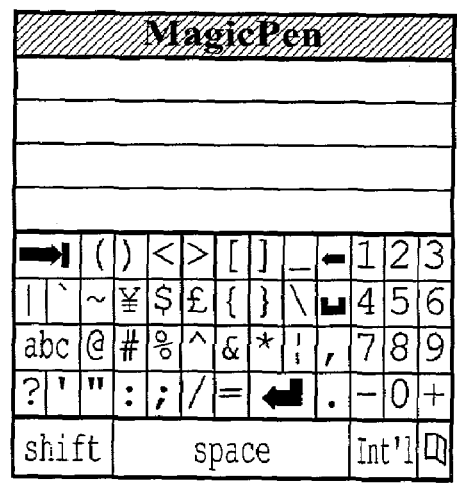
FIG. 13 shows a "Symbol" keyboard layout made according to an embodiment of the present invention.

FIG. 13 illustrates the layout of the "Symbol" keyboard. The symbol characters are laid out as shown in the FIGURE. As with the Natural keyboard, numbers "0" to "9" are organized as in traditional adding machines and calculators to facilitate ease of reference, and are oriented on the right side of the keyboard layout. The Symbol keyboard further includes two keys, shown in FIG. 13 as the "abc" and "Int'l" keys, which are dedicated to toggling between variations on the improved keyboard layout of the present invention. The keyboard includes a "door" icon to exit the keyboard option for data entry.

Figure 14:
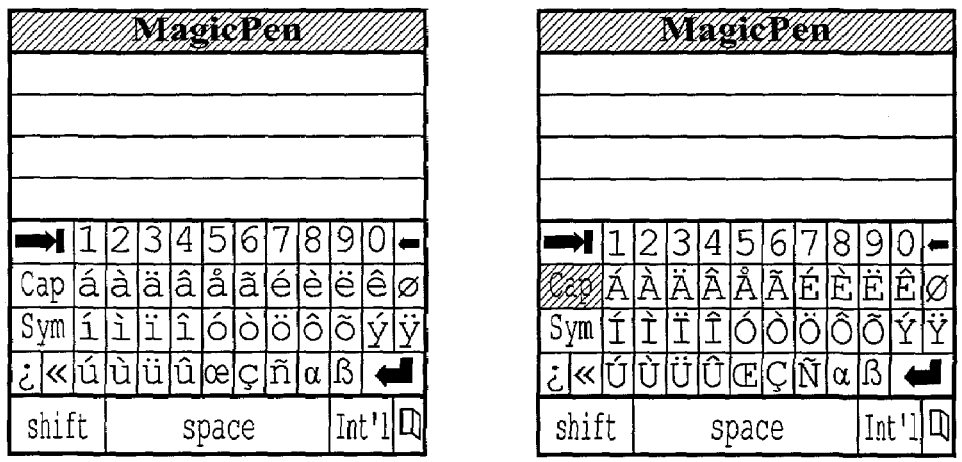
FIG. 14 shows an upper case and lower case "International" keyboard layout made according to an embodiment of the present invention.

FIG. 14 illustrates the layout of the "International" keyboard. This keyboard consists of frequently used characters having accents or other features useful for communicating the meaning and pronunciation of international characters. The international characters are laid out as shown in the FIGURE. Unlike with the Natural and Symbol keyboards, numbers "0" to "9" are organized as in a traditional typewriter layout, forming the top row of the keyboard. Some of the most frequently used symbols are interspaced around the edges of the alphabet character rows. The "Cap" key is used to alternate between the upper case and lower case keyboard options, as shown. The International keyboard further includes two keys, shown in FIG. 14 as the "Sym" and "abc" keys, which are dedicated to toggling between variations on the improved keyboard layout of the present invention. The keyboard includes a "door" icon to exit the keyboard option for data entry.

Figure 15:
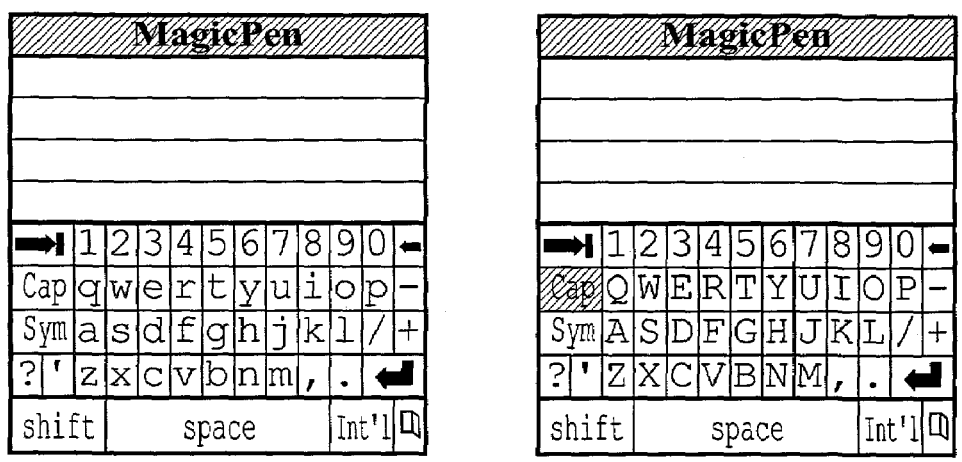
FIG. 15 shows an upper case and lower case modified QWERTY keyboard layout made according to an embodiment of the present invention.

FIG. 15 illustrates the layout of a modified "QWERTY" keyboard. The alphabet characters are laid out in the well-known QWERTY order. Numbers "0" to "9" are organized as in traditional typewriter layouts, forming the top row of the keyboard. Some of the most frequently used symbols are interspaced around the edges of the alphabet character rows and between the alphabet character rows and the number grid. The "Cap" key is used to alternate between the upper case and lower case keyboard options, as shown. The modified QWERTY keyboard further includes two keys, shown in FIG. 15 as the "Sym" and "Int'l" keys, which are dedicated to toggling between variations on the improved keyboard layout of the present invention. The keyboard includes a "door" icon to exit the keyboard option for data entry.

The Natural, Symbol, International and modified QWERTY keyboard layouts provide advantages over traditional keyboard layouts. Due to size restrictions, pen-based PDA's are largely incapable of efficiently operating similar to standard typewriter or computer keyboard. PDAs do not readily facilitate the use of two hands, or even two data entry pens 16. Thus, there is no advantage in mimicking the traditional QWERTY keyboard layout. Instead, there are advantages in having the more intuitive sequential alphabetical ordering of characters, as it more readily allows users, especially users without typing experience, to locate and enter the characters. The improved organization further allows numbers to be present on the Natural, Symbol, International and modified QWERTY keyboard layouts while maintaining size and space constraints inherent with the PDA 12. The Natural and Symbol keyboards have the further advantage of organizing numbers "0" to "9" as in traditional adding machines and calculators to facilitate ease of reference.

Figure 16:
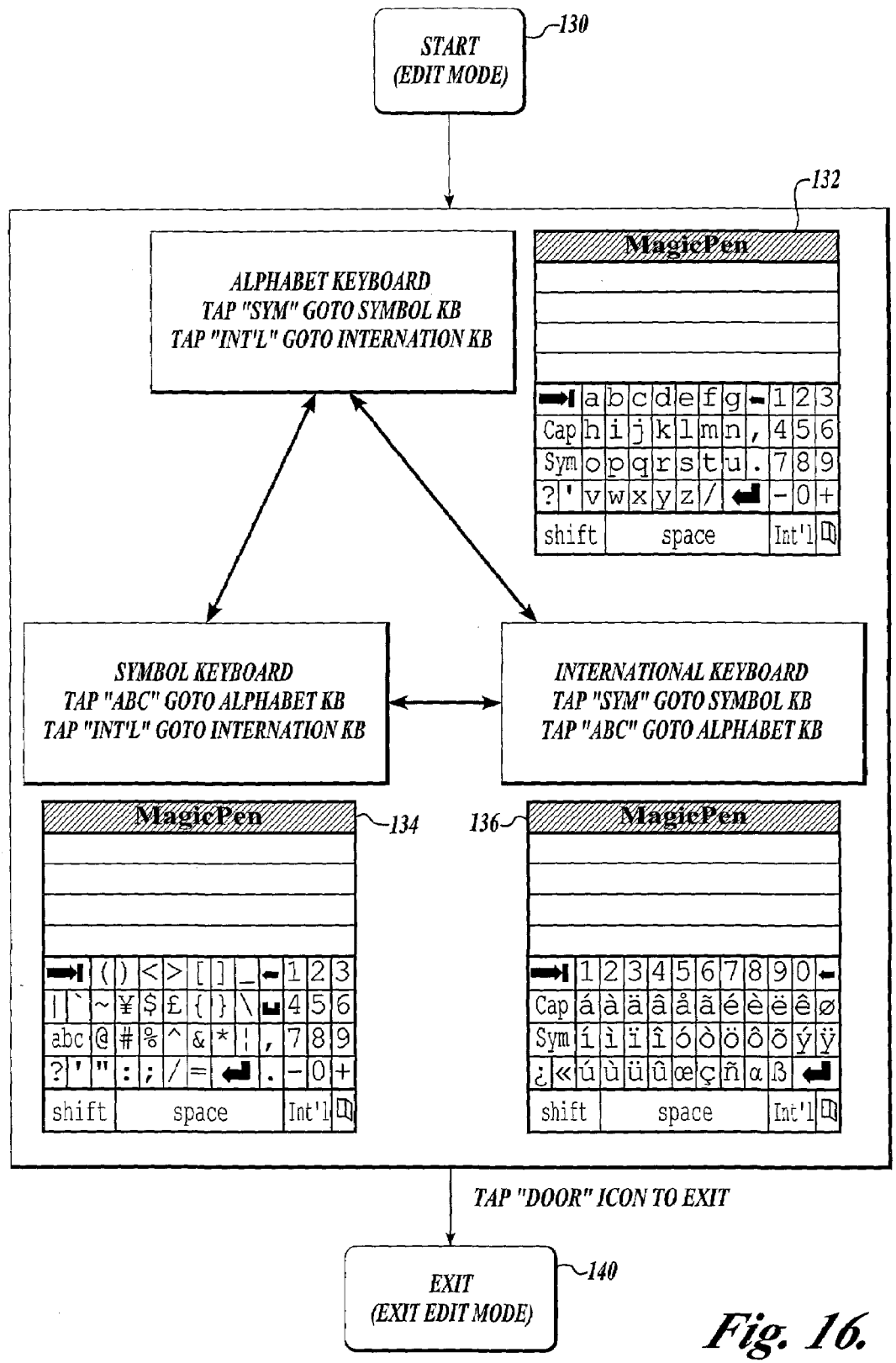
FIG. 16 is a relational chart showing the interaction between the Natural, Symbol, International and QWERTY keyboard embodiments of the present invention.

In the preferred embodiment, the user selects the default keyboard layout, either Natural or the modified QWERTY as described above, as an operational preference. Once selected, either default keyboard is readily switchable between the alphabet keyboard and either the Symbol or the International keyboards. The preferred interaction between the default alphabet keyboards and the Symbol and International keyboards is better understood with reference to FIG. 16. At point 130, the user initiates the keyboard edit mode by toggling the "keyboard" icon 38 in the handwriting input area 22 on the digitizer pad 14. Assuming the preferred keyboard layout is Natural, the Natural keyboard is presented in the viewing area 20 as shown at point 132. If the preferred keyboard layout is QWERTY, the modified QWERTY keyboard is presented in the viewing area 20. Toggling the "Sym" key on the Natural keyboard replaces the Natural keyboard with the Symbol keyboard, as shown at point 134. The "Sym" key on the Natural keyboard is replaced on the Symbol keyboard by the "abc" key. Toggling the "abc" key on the Symbol keyboard replaces the Symbol keyboard with the Natural keyboard. From the Natural keyboard, toggling the "Int'l" key replaces the Natural keyboard with the International keyboard, as shown at point 136. The "Int'l" key on the Natural keyboard is replaced on the International keyboard by the "abc" key. Toggling the "abc" key on the "Int'l" keyboard replaces the International keyboard with the Natural keyboard. Toggling the "Int'l" key from the Symbol keyboard replaces the Symbol keyboard with the International keyboard. Toggling the "Sym" key on the International keyboard replaces the International keyboard with the Symbol keyboard. Tapping the "door" icon from any keyboard exits the keyboard edit mode at point 140.

While the preferred embodiment of the invention has been illustrated and described, as noted above, many changes can be made without departing from the spirit and scope of the invention. For example, the relative location, size, shape and overall layout of the digitizer pad 14 areas can be modified to accommodate the size, shape and design of the PDA 12. Additional pen strokes may be associated with one or more of the characters illustrated in FIGS. 5-8. Likewise, the present invention is equally applicable to non-English or International language characters, other numerals such as Roman Numerals, and other and additional symbols. The specific threads used to perform the processes associated with the handwriting recognition engine may vary. For example, in the interest of design and manufacture cost, speed or efficiency, additional or fewer threads can be assigned to the various sub-processes involved in handwriting recognition. In addition, the order of the processing described with respect to FIG. 9 may be varied. For example, the precise point at which the system indicates that the handwriting box or combination of handwriting boxes is available or unavailable may change. The duration of the time delay used to capture multiple pen strokes associated with a single character may change to further optimize the efficiency of the handwriting recognition engine. Further examples may be seen with reference to the preferred embodiment for keystroke data input described above. For instance, the precise letters on each row in the sequential organization of the Natural and International keyboard layouts may be varied. Likewise, the symbols included and location on each of the keyboards may change according to predetermined criteria including anticipated user preferences and manufacturing restrictions. Accordingly, the scope of the invention is not limited by the disclosure of the preferred embodiment.

The embodiments of the invention in which an exclusive property or privilege is claimed are defined as follows:

1. A method for processing handwritten character strokes entered into a computer system by a user, comprising:
   providing a handwriting area for receiving alphabetic letter strokes, the handwriting area divided into a first input box, a second input box and a third input box;
   receiving handwritten character strokes entered into the first, second and third input boxes of the handwriting area, one or more of the handwritten character strokes forming input characters;
   interpreting input characters having the handwritten character strokes thereof entered into both the first and second input boxes of the handwriting area as upper case alphabetic characters but not as lower case alphabetic characters; and
   interpreting input characters having the handwritten character strokes thereof entered into both the second and third input boxes of the handwriting area as lower case alphabetic characters but not as upper case alphabetic characters.

2. The method of claim 1, wherein the steps of interpreting handwritten character strokes entered into the first, second and third input boxes of the handwriting area comprise:
   saving each handwritten character stroke received at the input boxes of the handwriting area in a memory; and
   recognizing a character based on all handwritten character strokes received at the related input boxes of the handwriting area.

3. A method for processing handwritten character strokes entered into a computer system by a user, comprising:
   providing a handwriting area for receiving number and symbol strokes, the handwriting area divided into a first input box, a second input box and a third input box;
   receiving handwritten character strokes entered into the first, second and third input boxes of the handwriting area, one or more of the handwritten character strokes forming input characters;
   interpreting input characters having the handwritten character strokes thereof entered into both the first and second input boxes of the handwriting area as number characters but not as symbol characters; and
   interpreting input characters having the handwritten character strokes thereof entered into both the second and third input boxes of the handwriting area as symbol characters but not as number characters.

4. The method of claim 3, wherein the steps of interpreting input characters comprise:
   saving each handwritten character stroke received at the first, second and third input boxes of the handwriting area in a memory; and
   recognizing a character based on all handwritten character strokes received at the first, second and third input boxes, respectively, of the handwriting area.

5. A method for processing handwritten character strokes entered into a computer system by a user, comprising:
   providing a first handwriting area for receiving alphabetic letter strokes, the first handwriting area divided into a first input box, a second input box and a third input box;
   providing a second handwriting area for receiving alphabetic letter strokes, the second handwriting area divided into a first input box, a second input box and a third input box;
   providing a third handwriting area for receiving number and symbol strokes, the third handwriting area divided into a first input box, a second input box and a third input box;
   receiving handwritten character strokes entered into the first, second and third input boxes of the first handwriting area, the handwritten character strokes forming input characters;
   receiving handwritten character strokes entered into the first, second and third input boxes of the second handwriting area, the handwritten character strokes forming input characters;

receiving handwritten character strokes entered into the first, second and third input boxes of the third handwriting area, the handwritten character strokes forming input characters;

interpreting input characters having the handwritten character strokes thereof entered into both the first and second input boxes of the first handwriting area and into the first and second input boxes of the second handwriting area as upper case alphabetic characters but not as lower case alphabetic characters;

interpreting input characters having the handwritten character strokes thereof entered into both the second and third input boxes of the first handwriting area and into the second and third input boxes of the second handwriting area as lower case alphabetic characters but not as upper case alphabetic characters;

interpreting input characters having the handwritten character strokes thereof entered into both the first and second input boxes of the third handwriting area as number characters but not as symbol characters; and interpreting input characters having the handwritten character strokes thereof entered into both the second and third input boxes of the third handwriting area as symbol characters but not as number characters.

6. The method of claim 5, wherein the steps of interpreting input characters comprise interpreting handwritten character strokes entered alternatively into the first handwriting area and into the second handwriting area.

7. The method of claim 5, interpreting input characters comprise:

saving each handwritten character stroke received at the handwriting area in a memory; and recognizing a character based on all handwritten character strokes related to each handwriting area.

8. A pen-based computer system, comprising:

a computing device having a digitizer pad and a data entry pen;

a first handwriting area comprising a subset of the digitizer pad for receiving handwritten alphabetic letter strokes input by the data entry pen, the first handwriting area divided into a first input box, a second input box and a third input box;

a second handwriting area comprising a subset of the digitizer pad for receiving handwritten alphabetic letter strokes input by the data entry pen, the second handwriting area divided into a first input box, a second input box and a third input box;

a handwriting recognition engine, the handwriting recognition engine interpreting a first series of handwritten alphabetic letter strokes having handwritten alphabetic letter strokes entered into both the first and second input boxes of the first handwriting area as upper case alphabetic characters but not as lower case alphabetic characters and interpreting a second series of handwritten alphabetic letter strokes having handwritten alphabetic letter strokes entered into both the first and second input boxes of the second handwriting area as upper case alphabetic characters but not as lower case alphabetic characters and interpreting a third series of handwritten character strokes entered into both the second and third input boxes of the first handwriting area as lower case alphabetic characters but not as upper case alphabetic characters and interpreting a fourth series of handwritten alphabetic letter strokes having handwritten alphabetic letter strokes entered into both the second and third input boxes of the second handwriting area as lower case alphabetic characters but not as upper case alphabetic characters.

9. The computer system of claim 8, wherein:

the computing device further includes a memory, and the handwriting recognition engine saves each handwritten alphabetic letter stroke received at the first, second and third input boxes of the first and second handwriting areas in a memory and recognizes a character based on all handwritten character strokes received related to each handwriting area.

\* \* \* \* \*